United States Patent [19]

Miller

[11] Patent Number: 5,406,838
[45] Date of Patent: Apr. 18, 1995

[54] MAGNETIC ANCHOR SYSTEM FOR FLUID LEVEL MEASURING DEVICES

[75] Inventor: Thomas L. Miller, Fairview, Mont.

[73] Assignee: Meridian Oil Inc., Houston, Tex.

[21] Appl. No.: 828,738

[22] Filed: Jan. 31, 1992

[51] Int. Cl.$^6$ ............................................. G01F 23/30
[52] U.S. Cl. .......................................... 73/149; 73/1 H; 73/319
[58] Field of Search ................ 73/1 H, 149, 317, 301, 73/319; 248/309.4

[56] References Cited

U.S. PATENT DOCUMENTS

| | | | |
|---|---|---|---|
| 1,141,500 | 6/1914 | Stahle | 73/317 |
| 1,202,854 | 10/1916 | Knight | 73/317 |
| 1,231,774 | 7/1917 | Mires | 73/314 |
| 1,585,382 | 5/1926 | Haigh et al. | 73/321 |
| 1,823,801 | 9/1931 | Hiatt | 73/321 |
| 2,117,185 | 5/1938 | Lynskey | 73/314 |
| 2,587,526 | 2/1952 | Quist | 73/321 |
| 2,697,350 | 12/1954 | Sorber | 73/317 |
| 3,200,646 | 8/1965 | Donko et al. | 73/317 |
| 3,452,420 | 7/1969 | Tomlinson | 73/306 |
| 3,545,272 | 12/1970 | McGill | 73/311 |
| 4,116,062 | 9/1978 | Reip | 73/322 |
| 4,373,388 | 2/1983 | Kitamura et al. | 73/301 |
| 4,406,152 | 9/1983 | Palmer et al. | 73/149 |
| 4,671,121 | 6/1987 | Schieler | 73/317 |
| 4,875,370 | 10/1989 | Spitzer | 73/149 |
| 4,939,457 | 7/1990 | Tellerman | 73/314 |
| 4,962,661 | 10/1990 | Levine et al. | 73/1 H |
| 5,072,618 | 12/1991 | Taylor et al. | 73/317 |
| 5,103,674 | 4/1992 | Outwater et al. | 73/319 |
| 5,152,170 | 10/1992 | Liu | 73/317 |

FOREIGN PATENT DOCUMENTS

| | | | |
|---|---|---|---|
| 0179713 | 11/1982 | Japan | 73/1 H |
| 556334 | 5/1977 | U.S.S.R. | |

Primary Examiner—Hezron E. Williams
Assistant Examiner—George M. Dombroske
Attorney, Agent, or Firm—Arnold, White & Durkee

[57] ABSTRACT

A magnetic anchor system which fixes the bottom of fluid level measuring devices to the bottom of fluid storage tanks. The magnetic anchor system is attached to the bottom of a fluid level measuring device. The magnetic anchor system comprises a magnet to sit on the bottom of the tank and a telescoping housing to allow some play to provide for seating at different points on a slant- or cone-bottom of the tank. In addition, a system to calibrate fluid level measuring devices that make use of a float which eliminates the need to raise or lower the fluid level in the tank to provide calibration.

11 Claims, 4 Drawing Sheets

MAGNETIC ANCHOR SYSTEM FOR FLUID LEVEL MEASURING DEVICES

BACKGROUND OF THE INVENTION

The present invention relates generally to tank gaging systems, and more particularly to a system for anchoring gaging apparatus to the bottom of fluid storage tanks. In addition, the present invention relates to a device and method to be used to calibrate tank gaging systems.

The use of fluid level measuring systems in fluid storage tanks is well known in the industry. Tank gaging systems typically employ a float which floats at the air/liquid interface within a tank. The positions of the float are calibrated to indicate how much liquid is in the tank at each given float position. Thus, a known quantity of liquid may be added to the tank, and the positions of the float relative to the bottom of the tank noted before and after tile addition. This procedure may be repeated to obtain a complete calibration of the tank and its gaging system. As is more frequently the case, however, one or more such observations may be used in conjunction with the known specifications of the tank to arrive at a complete calibration.

The fluid level measuring systems used in gaging tanks usually include pipe or tubing made of synthetic resins such as polyvinyl chloride, stainless steel, or other non-ferrous metals, which extend down into a tank from the top of the tank. The top of the pipe is connected to the top of the tank with a flange. In the past, the lower end of the pipe has been left to hang free, has been bolted to the bottom of the tank in some fashion, or even held down with heavy weights. A float is coupled to the pipe so as to move vertically along the pipe.

One specific gaging system marketed by the Bindicator Co., Port Huron, Mich., employs a float containing a magnetic member which triggers magnetic sensors positioned within and along a vertically disposed pipe.

When a fluid level measuring device is left to hang free in a tank it is very susceptible to being whipped around by fluid forcing its way into the tank. This whipping action, in turn, often causes the pipe portion of the device to be damaged. When the pipe breaks or cracks, the fluid may enter the sensitive measuring device, damaging it and causing it to have to be replaced. In severe instances, the lower part of the fluid measuring device may actually break off and fall to the bottom of the tank. This requires the tank to be drained of fluid so that someone can enter it and retrieve the broken parts.

The method of bolting a fluid level measuring device to the bottom of a tank is costly, time consuming, and above all dangerous. To bolt the fluid level measuring device to the bottom of a fluid storage tank requires that a person enter the hostile tank environment. To do this, the storage tank must first be emptied of fluid—a time consuming process which requires a costly vacuum truck to be on location. Next, sludge that has collected on the bottom of the tank must be cleaned out. To do this, a person must enter the tank to steam or wash it clean. At this point, safety is of the utmost concern because a tank may contain many dangers. For instance, in oil field or sewage treatment tanks, flammable hydrocarbon gas may well be present. In addition, poisonous gasses such as $H_2S$ may also be present. In general, therefore, a tank has to be vented thoroughly before anyone can enter the tank. This normally requires either a compressor on location to do the job quickly, or plenty of time to allow the tank to vent naturally. More than likely, however, time will be of the essence because the tank will typically be needed to store incoming fluid. Once a tank has been vented, it can then be cleaned so that it will be possible to work inside it. Once the tank has been cleaned, a person can then enter and bolt the fluid level measuring device to the bottom of the tank. The tank is then resealed and placed back in service.

The method of using a heavy weight to hold down a fluid level measuring device to the bottom of a tank is also fraught with problems. Thus, the tank bottom still needs to be cleaned at least partially, so that the weight can sit on the bottom of the tank. Further, to get a weight that will hold the fluid level measuring device steady in strong flowing fluids, the weight will have to be both heavy and bulky. And to install the weight without emptying a tank, the weight will have to be carried to the top of the tank which will often be 20 feet high or more. Even after taking all of these precautions, a weight that is seated on a slant- or cone-bottomed tank may slide down the bottom of the tank, thereby causing the fluid level measuring device to move resulting in errors in the calibration of that device.

Once a fluid level measuring device has been installed by any method including those discussed above, the device must be calibrated to give a correct reading of liquid level. In that regard, it is well known in the art to manually measure liquid level with a plum-bobbed measuring tape. Typically, the value read on the tape is the height at which the float of the fluid level measuring device sits on the liquid. This value is entered as a set point for calibrating the gaging device. After reading one value, the liquid level in the tank is either raised or lowered by a given volume of liquid, and a new liquid level is noted on the tape. This second value is also entered as a calibration set point. By thus entering these set points, the fluid level measuring device can be calibrated to give accurate readings of fluid level at all float locations. It will be apparent, however, that the process just described is both time consuming and difficult, mainly because it requires raising and lowering the fluid level in a large fluid storage tank. What is needed is a method to calibrate the fluid level measuring device without having to raise or lower the fluid level in the tank.

SUMMARY OF THE INVENTION

The present invention in one general aspect provides an improved system for anchoring a fluid level measuring device in a fluid storage tank. In another general aspect, the invention provides a method for calibrating fluid level measuring devices no matter how they are installed in tanks, without having to raise or lower the fluid level in the fluid level storage tank.

The anchoring system of the present invention comprises the use of a magnet which seats firmly on the bottom of a steel fluid storage tank. The magnet may also be used in fiberglass salt water storage tanks, provided a heavy metal plate is installed at the bottom of such a tank so that the magnet may fix to that plate.

Because many of the tanks used today are slant- or cone-bottom tanks, the anchoring system of the invention preferably has some play in it to allow for the magnet to seat at different places on a slanted bottom and still allow for the fluid level measuring device to be seated at the top of a fluid storage tank. To accomplish this flexibility, the anchoring system preferably includes a connecting rod which attaches to the magnet and a spacer member or longitudinally self-adjusting connector which is connected in a telescoping relationship to the connecting rod. The spacer member is preferably a housing, is hollow inside, and allows for the connecting rod to move freely in and out of the housing. By design, the spacer housing must be slightly longer than the connecting rod to provide full movement of the connecting rod into the spacer housing. However, the connecting rod need not be more than about six inches long for most applications because the slant of the bottom of most tanks is very gradual. The top of the spacer housing is adapted to be connected to the lower end of the fluid level measuring device.

To further compensate for a slant- or cone-bottom tank, different features may be added to the new anchoring system. Thus, the connecting rod may be made of a flexible material so that it will bend and allow the fluid level measuring device to remain in a straight north/south or vertical orientation. In the alternative, a swivel joint may be added on top of the magnet to enable the magnet to swivel up to about 15% in all directions. If such a swivel joint is used, the connecting rod can remain a rigid member thereby allowing the swivel joint to compensate for the slant- or cone-bottom tank.

From the above description and explanation, it will be apparent that the anchoring system disclosed herein addresses a number of the problems associated with free hanging, bolted down, or weighted down liquid level measuring devices. Thus, the anchoring system disclosed herein secures the lower end of the liquid level measuring device to the bottom of a tank so that device is not left free to whip around inside the tank. Under these conditions, not even strong fluid flow into a tank will damage the device.

The anchor system of the invention also does not require that a tank be emptied to install the system. The disclosed system is simply installed from on top of the fluid storage tank. Any minor bottom cleaning that needs to be done may be performed by lowering a steamer or hot-oiler hose from the top of the tank. The cleaning is preferably done using a specially adapted magnet anchor system with the steamer or hot-oiler hose. A regular anchor system is used except the spacer housing is replaced with a specially designed cap which allows the connecting rod to pass through it while at the same time it connects to the steamer or hot-oil hose. Holes are cut in a downward slant in the cap so that the fluid from the steamer or hot-oiler hose will jet clean about a 10" diameter area on the bottom of the tank. Then with the magnet the operator can check to ensure the magnet seats properly before removing all the cleaning apparatus. Once any such minor cleaning has been performed, the fluid level measuring system with its attached magnetic anchor may be lowered into the tank where the magnet will seat to the bottom. The fluid level in the tank never needs to be lowered. And more importantly, no person has to enter the hostile environment inside the fluid storage tank.

The new anchor system also addresses the problems inherent to the heavy weight system. Thus, the magnet system allows for easy cleaning of a small portion of the tank bottom. The magnet system can then use a super magnet, preferably a rare earth magnet, which is very small in size and weight but affixes to metal with an appropriate break-away strength. An appropriate break-away strength is one that is strong enough to hold the device securely to the tank bottom while being weak enough to unseat without damaging the fluid level gaging equipment. Use of the magnet not only obviates the need to haul a heavy bulky weight to the top of a tank; it also seats securely to the bottom of the tank and will not shift even if the tank bottom is slanted.

The invention also comprises a method of calibrating a fluid level measuring device that does not require raising or lowering the fluid level in the tank. This aspect of the invention makes use of a heavy calibrating collar or other suitable member which fits around the pipe component of the fluid level measuring device, and sits on top of the float component which is used to measure the fluid level. In a preferred embodiment, the float component comprises a float collar and a plurality of brushes attached to the bottom of the calibrating collar so that the brushes will slide over and grip the float collar of the fluid level measuring device so as to hold the two collars together. The calibrating device is then attached to a calibrating cable which can be either metal or fiber rope which is marked off in feet and inches or other linear units. The tank specifications will typically give the specific dimensions from the top to the bottom of any tank in any particular place in the tank. As an alternative, a plum-bobbed measuring tape may be used to determine the specific height of the tank where the gaging device is seated. So once the calibrating collar is connected to the float collar, it is a simple matter for the operator, using the cable or rope, to determine the specific distance from the top of the tank to the float collar. By subtracting that distance from the total height of the tank at the fluid level measuring device, the operator may readily calculate what the fluid level would be at that point and enter it into the fluid level measuring device. As is obvious from this description, it is not important that the fluid level actually be at the float collar to make this calibration work. The fluid level measuring device assumes that wherever the collar is, that is where the fluid level is. So the operator may simply allow the heavy calibrating collar to force the float collar down to the bottom of the tank, take a reading and enter that calibration set point, then pull the float and calibrating collar up the pipe to a new position, and then take another reading and enter that calibration set point. It is preferable to take a reading near the bottom and one near the top. When the fluid level measuring device is sufficiently calibrated, the operator may give a good yank on the cable or rope to pull the brushes and the calibrating collar from the float collar and thereby enable the float collar to rise back to sit at the fluid level. This system thus avoids having to go through the time consuming calibration process of raising and lowering the fluid level in large fluid storage tanks. In addition, the method is as accurate as the method of using a bobbed measuring tape with adjustments in the fluid level.

DETAILED DESCRIPTION OF THE INVENTION

Figure 1:
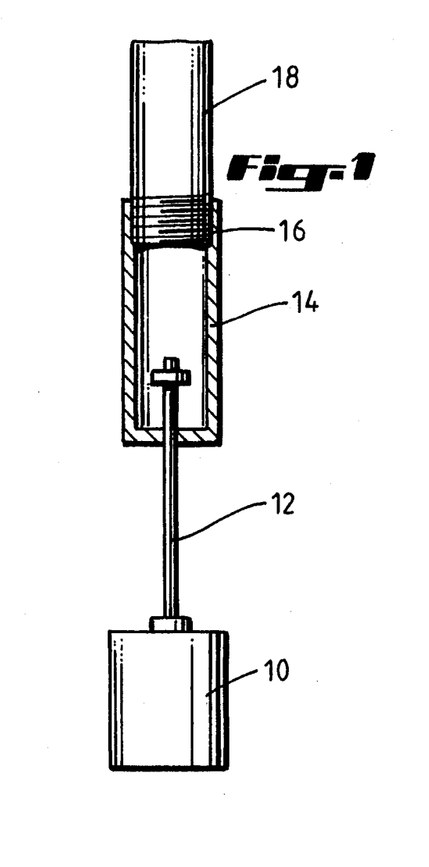
FIG. 1 is a schematic, partial, cross-sectional view of one form of a magnetic anchor system attached to a fluid level measuring device.

FIG. 1 illustrates an anchor system of the invention attached to the lower end of a pipe component 18 of a fluid level measuring device. A magnet 10 is attached to a connecting rod 12. The connecting rod 12 fits telescopically into a longitudinally self-adjusting connector or spacer housing 14. The top of the spacer housing 14 is adapted to attach to the bottom of the fluid level measuring device at the threaded joint 16.

The connecting rod 12 is designed to be long enough to enable the magnet 10 to seat on the bottom of a tank and also to enable the top of the pipe component 18 to be connected at the top of the fluid storage tank. The spacer housing 14 is necessarily designed to be longer than the connecting rod 12. The telescoping feature compensates for the slight slant of cone bottom tanks or other possible irregularities.

In a preferred embodiment, the connecting rod 12 may be made of flexible material so that it may flex to compensate for the slant of the bottom of a tank while allowing the fluid level measuring device to stay in an upright vertical position. The magnet 10 is a super magnet, such as a rare earth magnet, with high break-away strength in a small compact size. In a further preferred embodiment, the rare earth magnet 10 should have enough break-away strength to securely hold the fluid level measuring device to the bottom of the tank, while providing a low enough break-away strength to allow the magnet to be separated from the tank bottom by pulling up on the fluid level measuring device without damaging that device. A break-away strength of about 200 pounds is preferred. In a further preferred embodiment, the connecting rod 12 and the spacer housing 14 are made of stainless steel, preferably 316 stainless steel, to prevent corrosion by fluids in the tank. The pipe 18 is preferably plastic, stainless steel, or non-ferrous metal to enable use with a magnetic-type level detector and prevent corrosion.

Figure 2:
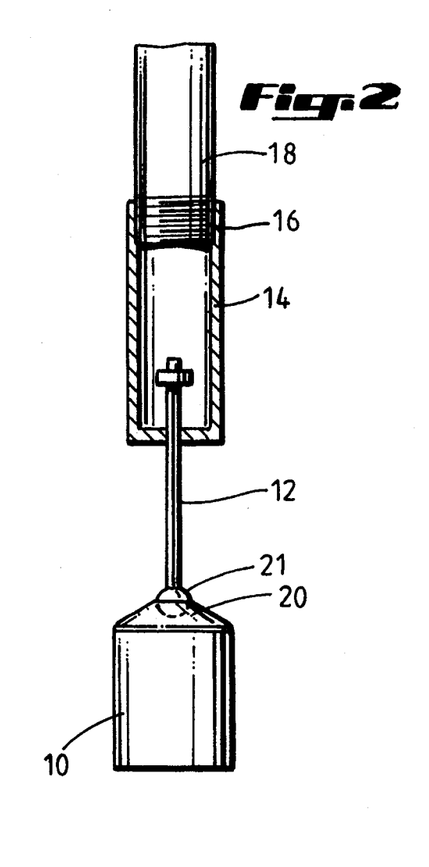
FIG. 2 is a schematic, partial, cross-sectional view of another form of a magnetic anchor system attached to a fluid level measuring device.

FIG. 2 illustrates another preferred embodiment of a magnetic anchor system attached to a fluid level measuring device. In this preferred embodiment, the magnet 10 is attached to a swivel joint 20. The swivel joint 20, which includes a swivel bearing 21, preferably provides for at least 15° slant from vertical in all directions to accommodate the bottoms of tanks which are slanted. The swivel joint 20 may be the same swivel joint which is used on the bottom of the legs of kitchen chairs to compensate for the slight incline of the chair legs. The swivel joint 20 is then connected to a connecting rod 12 by the swivel bearing 21. In this preferred embodiment, the connecting rod 12 is preferably a rigid member. The connecting rod 12 is connected telescopically to a spacer housing 14. The top of the spacer housing 14 is adapted to be attached to the bottom of a fluid level measuring device at joint 16.

In a further preferred embodiment, the magnet 10 is a super magnet, preferably a rare earth magnet. The swivel joint 20, swivel bearing 21, connecting rod 12, and the spacer housing 14 are preferably made of stainless steel. In a further preferred embodiment, the magnet 10 is a rare earth magnet with about 100-200 pounds of break-away strength.

Figure 3:
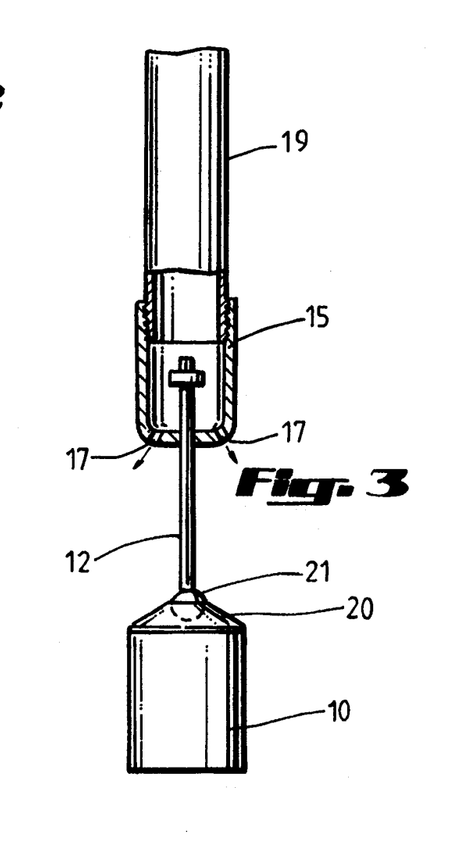
FIG. 3 is a schematic, cross-sectional view of a preferred embodiment of a magnetic anchor tool which may be used to clean a small area on the bottom of the tank prior to installing the devices of FIGS. 1 and 2.

FIG. 3 illustrates a preferred embodiment of a magnetic anchor tool which may be used to clean a small area on the bottom of a tank prior to installing the magnetic anchoring devices of FIGS. 1 and 2. The cleaning tool includes the same magnet 10, swivel-joint 20 with swivel bearing 21, and connecting rod 12 as shown in FIGS. 1 and 2. However, in the cleaning tool, the spacer housing 14 is replaced by an orifice cap 15 which has a plurality of orifices 17 cut in a downward outwardly angled direction. The orifice cap 15 is threaded at its top so that a steamer or hot-oiler hose 19 may be screwed onto the cleaning tool. The cleaning tool of FIG. 3 is lowered into the fluid storage tank at the same location where the fluid level measuring device is to be installed later. As the steamer or hot-oiler hose with the cleaning tool approaches the bottom, the hot fluid is pumped through the steamer or hot-oiler hose and exits through the orifices 17, cut in the orifice cap 15. This action cleans a small area on the bottom of the tank. The magnet 10 on the cleaning tool may be used to ensure the bottom is clean enough to achieve proper seating on the bottom of the tank. Once the bottom of the tank is cleaned and the seating ability tested, the cleaning tool and steamer or hot-oiler hose can be removed. The fluid level measuring device with either the magnetic anchoring device of FIG. 1 or 2 can then be installed in the tank.

Figures 4, 5:
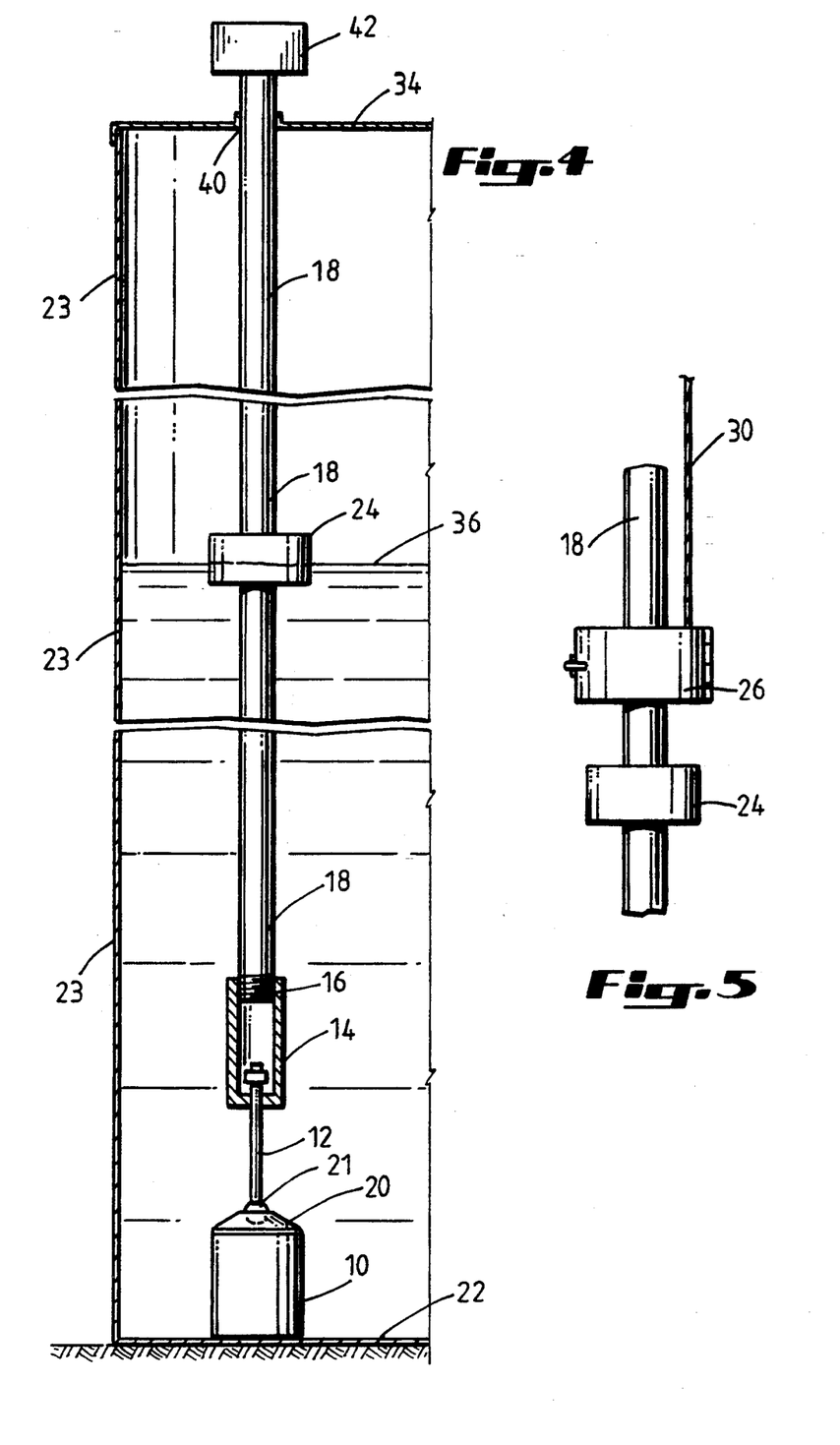
FIG. 4 is a schematic, cross-sectional view of a fluid level measuring device installed in a flat bottom steel tank using the magnetic anchor system of FIG. 2.
FIG. 5 is a schematic, cross-sectional view of a system used to calibrate a fluid level measuring device.

FIG. 4 illustrates the magnetic anchor system of FIG. 2 fixed to the bottom 22 of a flat bottom steel tank 23 and attached to a fluid level measuring device which is attached to the top 34 of the tank 23. The fluid level measuring device shown utilizes a pipe 18 made of polyvinyl chloride, stainless steel, or non-ferrous metal. Inside the pipe 18 is contained sensors which are magnetically activated. The fluid level measuring device also utilizes a float 24 which contains magnets which activate the sensors located inside the pipe 18. The float 24 floats at the fluid/gas contact line 36. The top of the pipe 18 is connected with a flange 40 to the top 34 of the tank 23. Attached to the top of the pipe 18 is a instrument head 42 which contains electronic equipment which accesses the information sent by the sensors contained within the pipe 18. The electronics within the instrument head 42, once properly calibrated, will convert the indication of where the float 24 is located on the pipe 18 into a fluid level reading. The electronics in the instrument head 42 will then send the fluid level information to a display screen which is typically located at ground level so that the person accessing the information does not need to climb to the top 34 of the tank 23. One such fluid level measuring device is marketed by the Bindicator Co. of Port Huron, Mich.

The bottom of fluid level measuring device is attached to the top of the spacer housing 14 of the magnetic anchoring system at the threaded connection 16. The spacer housing is connected telescopically to the connecting rod 12. The connecting rod is designed to be long enough to correct for any slant or imperfections in the bottom 22 of the tank 23, since the pipe 18 of the fluid level measuring device is a set length and is attached to the top 34 of the tank 23. Typically, the connecting rod 12 need be no longer than about 6 inches. The slant of the bottom 22 of the tank 23 is typically very gradual, if there is any slant at all. The spacer housing 14 is necessarily designed to be longer than the connecting rod 12 to provide full and free movement of the connecting rod into the spacer housing 14. The spacer housing 14 is necessarily hollow. The spacer housing 14 may be constructed of a cap with a hole cut for the connecting rod 12 to pass through, a threaded nipple which screws onto the cap, and a threaded collar which attaches to the top of the nipple and the bottom of the fluid level measuring device.

The connecting rod 12 is connected to the swivel bearing 21 of the swivel joint 20. The swivel joint 20 may be the same swivel joint which is used on the bottom of the legs of kitchen chairs to compensate for the slight incline of the chair legs. The swivel joint 20 is attached to the top of a super magnet 10. The super magnet 10 is a magnet which is small and compact but has high break-away strength. The break-away strength needs to be high enough to secure the fluid level measuring device to the bottom 22 of the tank 23-even in a strong fluid flow. However, the break-away strength of the super magnet 10 must be low enough so that by pulling up on the fluid level measuring device from the top 34 of the tank 23 the magnet 10 will release from the bottom 22 and not damage either the pipe 18 or the sensors in the pipe 18. A preferred break-away strength for the magnet 10 is about 200 pounds. One such super magnet 10 is a rare earth magnet. One such rare earth magnet is marketed by Dings in Milwaukee, Wis.

FIG. 5 illustrates a device for calibrating a fluid level measuring device. A hinged collar 26 is designed to fit around the pipe 18 of the fluid level measuring device and to sit on top of the float 24 of the fluid level measuring device. The hinged collar 26 is then attached to a cable or rope 30 which is marked with English, metric or other linear units of measurement. The hinged collar 26 is heavy enough to overcome the buoyancy of the float 24. In a preferred embodiment, the hinged collar 26 is made of stainless steel and/or brass to prevent corrosion. In a further preferred embodiment, the hinged collar 26 is made of 316 stainless steel.

Figure 6:
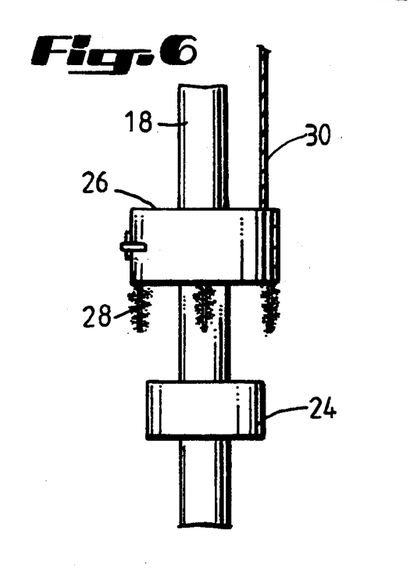
FIG. 6 is a schematic, cross-sectional view of a preferred embodiment of a system used to calibrate a fluid level measuring device.

FIG. 6 illustrates a preferred form of the device of FIG. 4 used to calibrate a fluid level measuring device. In the preferred embodiment, attached to the bottom of the hinged collar 26 is a plurality of brushes 28 which are arranged so that they will fit snugly around the float 24. In a further preferred embodiment, the brushes 28 are made of metal. Preferably, the brushes 28 are brass brushes of the type used to clean guns. The weight of the hinged collar 26 is great enough to overcome the resistance of the brushes 28 and to force the brushes 28 down and around the float 24.

Figure 7:
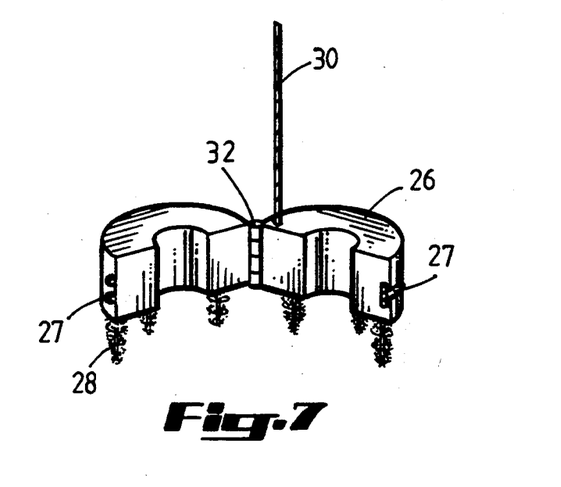
FIG. 7 is a schematic, perspective view of the calibration collar shown in FIG. 5 in an open position.

FIG. 7 illustrates a preferred embodiment of the calibration device of FIGS. 5 and 6 with the hinged collar 26 open. The hinge 32 is shown between the two open portions of the collar 26. The hinged collar 26 is equipped with a latch arrangement 27 to secure the collar 26 in a closed position around the pipe portion 18 of the fluid level measuring device.

Figure 8:
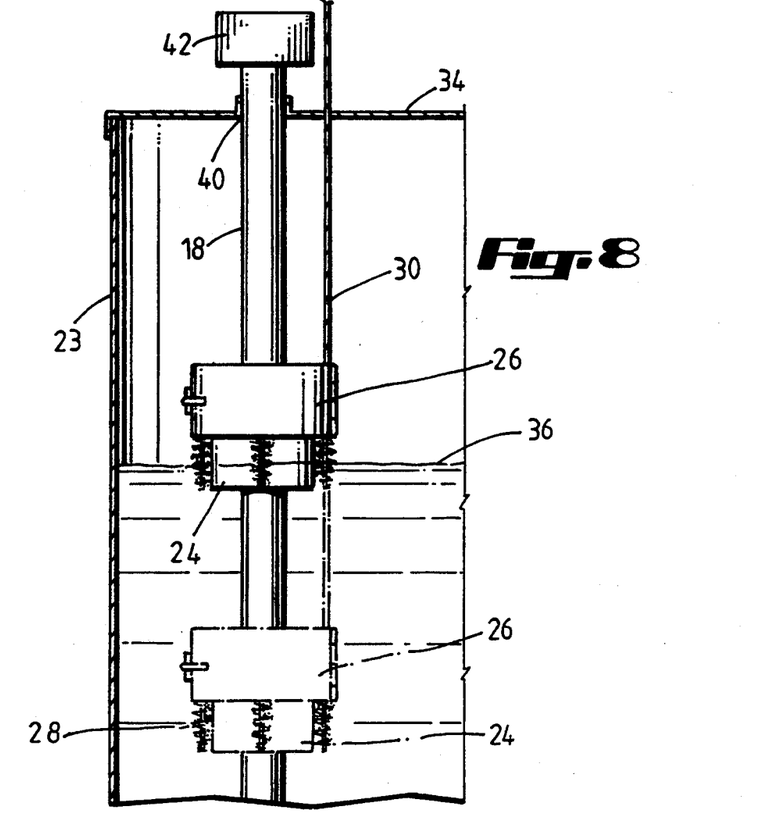
FIG. 8 is a schematic, partial, cross-sectional view of a preferred embodiment of the invention showing the calibration of a fluid level measuring device.

FIG. 8 illustrates two positions within a tank 23 of a preferred embodiment of the calibration system of FIGS. 4–6 as it is used to calibrate a fluid level measuring device inside the tank 23. In the first position, the float collar 24 of the fluid level measuring device is shown floating at the fluid/gas contact line 36. The calibration collar 26 is shown sitting directly on top of the float 24. The brushes 28 attached to the calibration collar 26 are fitted snugly around the float 24. The calibration collar 26 is connected to the calibration cable or rope 30 which is shown extending up through the top 34 of the tank 23. In the second position, the calibration collar 26 and the float collar 24 are in the same relation! to each other as they are at position 1. At position 2, the calibration collar 26 and the float collar 24 are located below the fluid/gas contact line 36.

Generally inside the tank, the float collar 24 floats at the fluid/gas contact line 36. The calibration collar 26 is attached around the pipe 18 from the top 34 of the tank 23. The calibration collar 26 is then lowered to the float 24 using the cable or rope 30. The calibration collar 26 is seated over the float 24 by forcing the plurality of brushes 28 over the float 24. A measurement using the calibrated cable or rope 30 is made to determine the distance from the top 34 of the tank 23 to the float 24. Using the height specifications of the tank or the actual measured height of the tank at the fluid level measuring device, the distance from the bottom of the tank to the float 24 may be calculated by subtracting the measured distance from the top 34 of the tank 23 to the float 24 from the total height of the tank 23 at the fluid level measuring device. The distance from the bottom of the tank to the float 24 is entered into the fluid level measuring device as the fluid level of the tank where the float 24 sits. The calibrating collar which is now attached to the float 24 is then allowed to sink by allowing more cable 30 to enter the top 34 of the tank 23. The weight of the calibrating collar 26 will force the float 24 to sink below the fluid/gas contact line 36 to position 2. Once at position 2 the distance from the top 34 of the tank 23 to the float 24 is once again measured and the distance from the bottom of the tank 23 and the float 24 can be calculated as described above. The distance at position 2 from the bottom of the tank 23 to the float 24 is entered into the fluid level measuring device as the fluid level where the float sits at position 2. The process of lowering the float 24 to new positions and calculating distances may be repeated as many times as necessary to ensure enough set points for proper calibration of the fluid level measuring device. The fluid level measuring device's internal computing capabilities can then use the entered set points to calibrate for the fluid level at any given point up and down the pipe 18 of the fluid level measuring device. The calibrating collar 26 can then be removed by disengaging the brushes 28 from the float 24 with a strong yank of the cable or rope 30 and pulling the calibrating collar 26 to the top 34 of the tank 23.

A preferred method of calibrating using the calibration tool with brass brushes 28 is as follows. The calibration collar 26 is lowered onto the float 24 and the brushes 28 are forced around the float 24. The calibration collar 26 is then allowed to force the float all the way to the bottom of the tank 23. At the bottom a set point is calculated then entered. Then the operator pulls the calibration collar 26 with the float 24 attached to a position near the top 34 of the tank 23. As can be seen, with the brushes 28 it does not matter whether the fluid/gas contact line 36 is near the top 34 of the tank 23 or not. The brushes 28 will secure the float 24 to the calibrating collar whether the float 24 is submerged or not. A second set point is then calculated and entered for the position near the top 34 of the tank 23. This will provide a wide distance between the set points to ensure proper calibration. The operator can then jerk up on the cable or rope 30 and release the brushes 28 allowing the float 24 to float free or fall back to the fluid/gas contact line 36.

Figures 9, 10, 11:
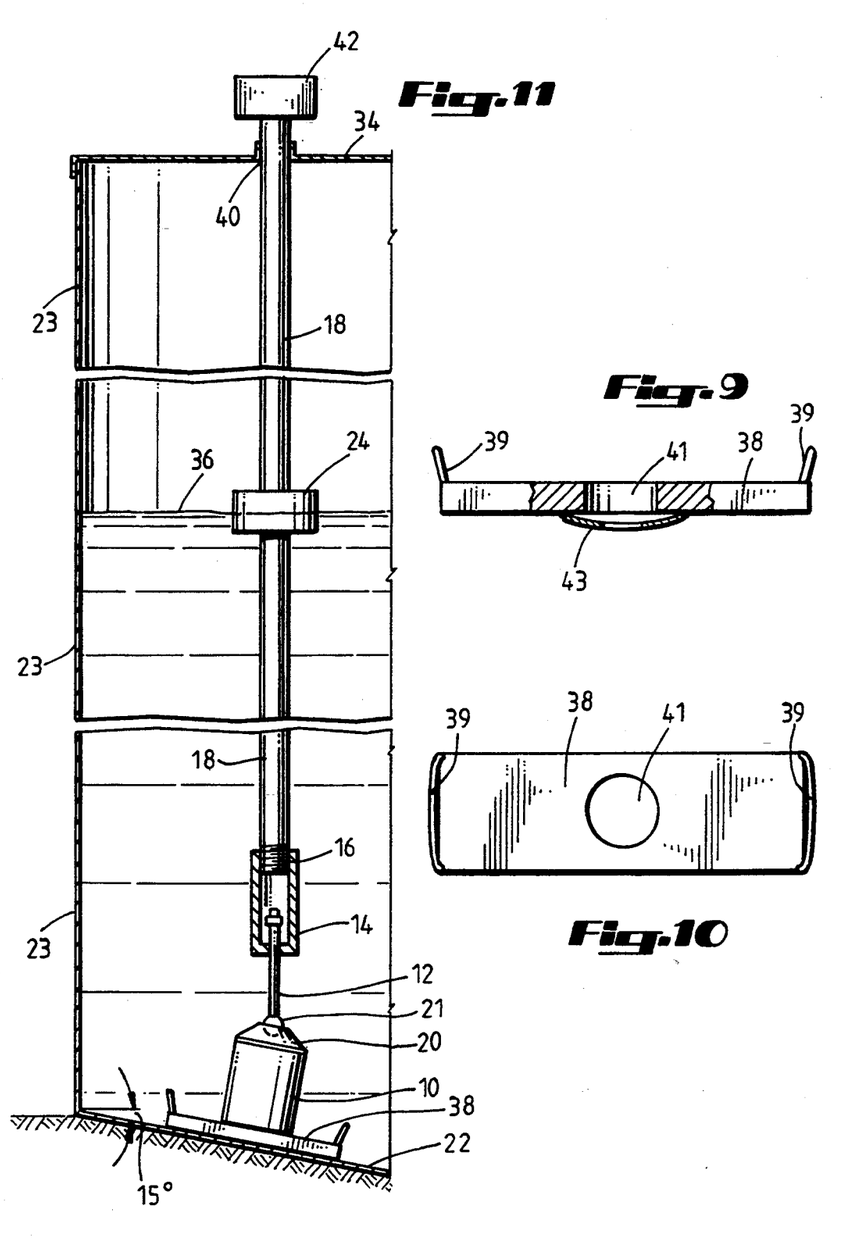
FIG. 9 is a schematic, cross-sectional view showing a preferred embodiment heavy metal plate assembly that is placed at the bottom of a fiberglass tank and is used to seat the magnet anchor system of FIG. 1 or 2.
FIG. 10 is a top view of FIG. 9.
FIG. 11 is a schematic, partial, cross-sectional view of the system of FIG. 2 installed in a fluid storage tank and fixed to a heavy metal plate which rests on the slanted bottom of the tank.

FIG. 9 illustrates the preferred embodiment of the heavy metal plate to be used in a fiberglass tank for seating the magnet anchor system of FIGS. 1 and 2. The metal plate 38 must be heavy enough to secure the fluid level measuring device even in a heavy fluid flow. Preferably the metal plate 38 weighs at least 20 pounds. The metal plate 38 has a hole 41 cut through it so that a steamer or hot-oiler hose may be attached through the plate 38. At the bottom of the metal plate 38 and over the hole 41 is welded a curved washer 43. The curved washer 43 is bent so that it can be welded on only two opposite sides. The curved design of the washer 43 will allow the fluid from the steamer or hot-oiler hose connected through the hole 41 to be sprayed under the bottom of the plate 38. Loops 39 are attached to the plate 38, preferably by welding, so that ropes may be used to lower the plate 38. To install the plate 38, the bottom is first cleaned by attaching a steamer or hot-oiler hose to the plate 38 and attaching a rope or cable to one or both of the loops 39, then lowering the plate 38 into the tanks spraying fluid to clean the bottom of the tank. The hose is then backed-off or unscrewed from the plate 38. The hose is then pulled out of the tank and the plate 38 is left at the bottom of the tank.

FIG. 10 illustrates a top view of FIG. 9 without the curved washer 43. The hole 41 is cut completely through the plate 38. The plate 38 is cut to a size so that it can fit through a hatch at the top 34 of the tank 23.

FIG. 11 illustrates the preferred embodiment of a magnetic anchor system as illustrated in FIG. 2 fixed to a heavy metal plate 38, which rests on the bottom 22 of a slant- or cone-bottom tank and attached to a fluid level measuring device 18 at 16 which is attached to the top 34 of the tank. The use of the heavy metal plate 38 disclosed in FIG. 9 allows the magnetic anchor system of FIG. 1 and FIG. 2 to be used in fiberglass fluid storage tanks.

The invention claimed is:

1. Apparatus for anchoring a fluid level measuring device in a fluid storage tank wherein the device when installed in the tank has a stationary component and a movable float component which moves in response to changes in the level of fluid in the tank, said apparatus comprising:
   a magnet positionable on the bottom of the tank; and
   vertically disposed connection means connecting said magnet to said stationary component, said connection means being longitudinally self-adjusting to compensate for variations in distance between said stationary component and the bottom of said fluid storage tank.

2. The apparatus of claim 1 wherein said stationary component comprises a vertically disposed tubular member attached at its upper end to the top of the tank and a plurality of magnetic sensors spaced along the tubular member, and the movable float component comprises a magnetic float adapted to move along the tubular member.

3. The apparatus of claim 1 which further comprises a swivel joint interconnecting the magnet and the connecting means.

4. The apparatus of claim 1 wherein the magnet comprises a rare-earth magnet.

5. The apparatus of claim 1 wherein the longitudinally self-adjusting means comprises a vertically disposed connecting rod connected at one end to the magnet and coupled at its other end in telescoping relation with said stationary component.

6. The apparatus of claim 5 wherein the swivel joint provides for up to at least 15 degrees slant from vertical in all directions.

7. An apparatus for anchoring a fluid level measuring device in a fluid storage tank, comprising:
   a) a rare-earth magnet;
   b) a swivel joint, said swivel joint being attached to said rare-earth magnet;
   c) a connecting rod attached to the top of said swivel joint said swivel joint allowing up to about a 15-degree slant from vertical in all direction;
   d) a longitudinally self-adjusting connector adapted to couple the connecting rod to said fluid level measuring device within said fluid storage tank.

8. A method of installing a fluid level measuring device in a fluid storage tank, comprising:
   (a) providing an apparatus for anchoring said fluid level measuring device, wherein the device when installed in the tank has a stationary component and a movable float component which moves in response to changes in the level of fluid in the tank, said apparatus comprising a magnet positionable on the bottom of the tank, and vertically disposed connection means connecting said magnet to said stationary component, said connection means being longitudinally self-adjusting to compensate for variations in distance between said stationary component and the bottom of said fluid storage tank;
   (b) attaching said apparatus to said fluid level measuring device;
   (c) lowering said fluid level measuring device attached to said apparatus into said fluid storage tank;
   (d) seating the magnet of said apparatus to the bottom of said fluid storage tank; and
   (e) calibrating said fluid level measuring device.

9. The method of claim 8 above wherein said magnet is a rare-earth magnet.

10. A method of installing a fluid level measuring device in a fluid storage tank, comprising:
    (a) providing an apparatus for anchoring said fluid level measuring device, wherein the device when installed in the tank has a stationary component and a movable float component which moves in response to changes in the level of fluid in the tank, said apparatus comprising a magnet positionable on the bottom of the tank, and vertically disposed connection means connecting said magnet to said stationary component, said connection means being longitudinally self-adjusting to compensate for variations in distance between said stationary component and the bottom of said fluid storage tank;

(b) attaching said apparatus to said fluid level measuring device;

(c) installing a heavy metal plate on the bottom of said fluid storage tank;

(d) lowering said fluid level measuring device attached to said apparatus into said fluid storage tank;

(e) seating the magnet of said apparatus to said heavy metal plate at the bottom of said storage tank; and (f) calibrating said fluid level measuring device.

11. The method of claim 10 wherein said heavy metal plate is lowered into said fluid storage tank from the top of said tank.

* * * * *